United States Patent [19]

Burcham

[11] Patent Number: 4,823,117
[45] Date of Patent: Apr. 18, 1989

[54] ELECTRONIC OIL PRESSURE SENSOR CIRCUIT

[75] Inventor: Stephen W. Burcham, Madison, Ala.

[73] Assignee: Chrysler Motors Corporation, Highland Park, Mich.

[21] Appl. No.: 114,332

[22] Filed: Oct. 29, 1987

[51] Int. Cl.$^4$ .............................................. G08B 21/00
[52] U.S. Cl. .................... 340/626; 340/451; 310/338; 73/727
[58] Field of Search ............... 340/626, 60, 657, 661, 340/665; 73/115, 727; 310/338; 200/81 R

[56] References Cited

U.S. PATENT DOCUMENTS

| | | | |
|---|---|---|---|
| 4,163,964 | 10/1979 | De Filippis | 338/215 |
| 4,320,664 | 3/1982 | Rehn et al. | 73/708 |
| 4,567,395 | 1/1986 | Pundarika | 310/338 |
| 4,570,097 | 2/1986 | Shukla et al. | 310/338 |
| 4,590,400 | 5/1986 | Shukla et al. | 310/338 |
| 4,602,248 | 7/1986 | Foster et al. | 340/626 |
| 4,616,114 | 10/1986 | Strasser | 200/83 |
| 4,620,438 | 11/1986 | Howng | 73/35 |
| 4,633,579 | 1/1987 | Strasser | 29/622 |
| 4,645,965 | 2/1987 | Paganelli | 310/338 |
| 4,662,540 | 5/1987 | Schroter | 340/626 |

Primary Examiner—Joseph A. Orsino
Assistant Examiner—Jeffery A. Hofsass
Attorney, Agent, or Firm—Mark P. Calcaterra

[57] ABSTRACT

An electronic oil pressure transducer circuit interfaces a piezoresistive pressure sensor to magnetic needle movement and lamp or electronic instrument control computer for reliable automotive engine oil pressure instrumentation. Circuit design uses standard components suited for automotive under-hood environment. Calibration is performed at the design level, eliminating the need for expensive on-line procedures. Circuit assembly is designed for automated, high-volume production.

2 Claims, 1 Drawing Sheet

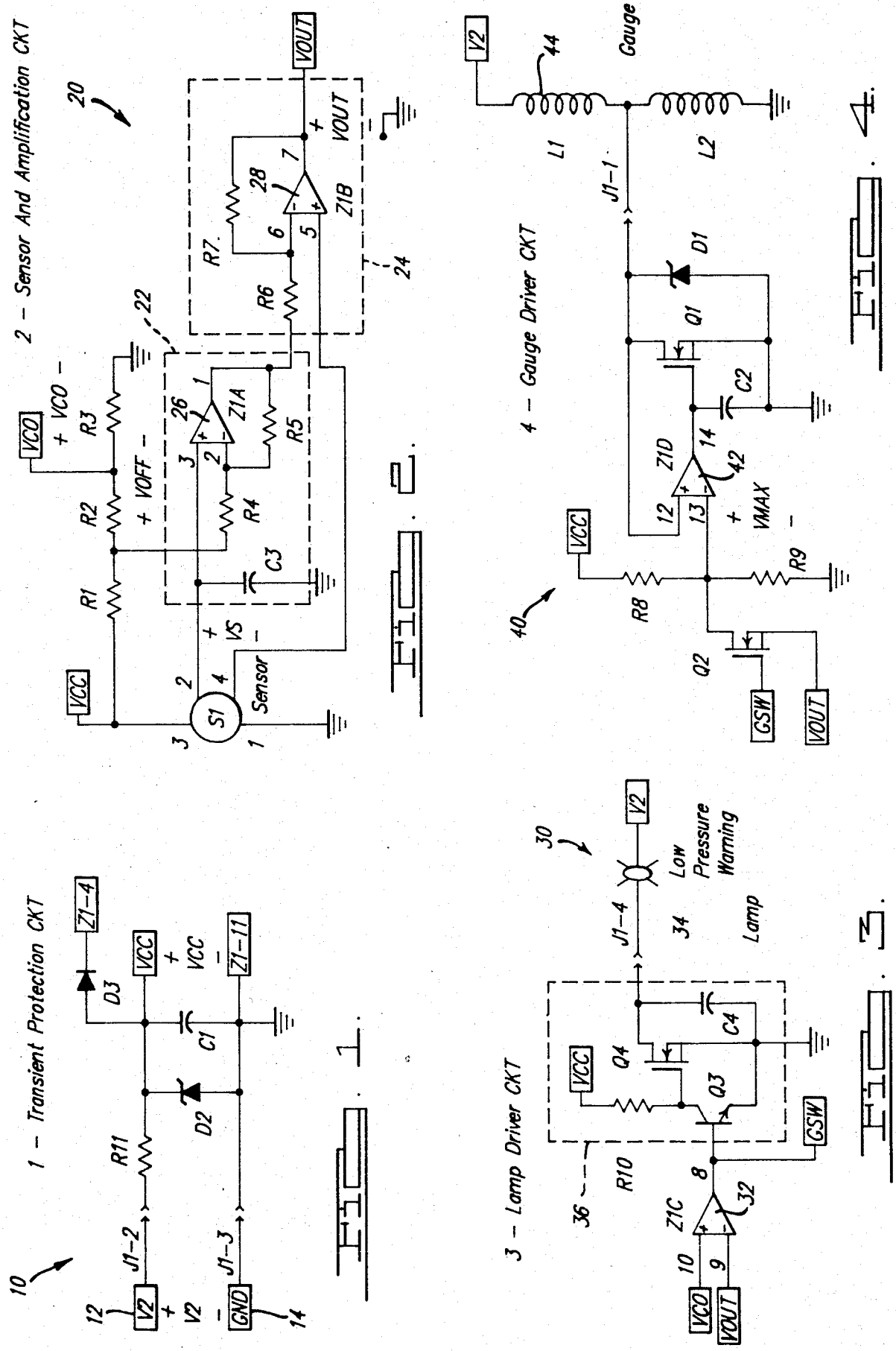

ELECTRONIC OIL PRESSURE SENSOR CIRCUIT

BACKGROUND OF THE INVENTION

1. Field of the Invention

The subject invention relates to electronic pressure sensing and signal conditioning applied to automotive engine oil pressure instrumentation.

2. Prior Art

The typical automotive oil pressure sensor is a mechanically intensive device with many moving parts. An example of such a device is a mechanical diaphragm transducer with magnetic or bi-metallic needle movement. The diaphragm expands under pressure, thus displacing the wiper of the potentiometer and providing a variable resistance with respect to pressure. The potentiometer is an integral part of the movements' electrical circuit.

The problem is that such devices provide an unreliable and inaccurate engine oil pressure sensing means. Further, a mechanical potentiometer provides a poor signal for microcomputer controlled instrumentation, ignition and fuel control systems. In addition, these devices are not satisfactory for the rugged automotive under-hood environment and are not designed for high-volume, low-cost production.

Others have attempted various solutions to the above problems. One example is U.S. Pat. No. 4,590,400 to Shukla et al. which discloses a piezoelectic cylinder pressure transmitter.

U.S. Pat. No. 4,163,964 to De Fillippis discloses a pneumatic or hydraulic pressure sensors with several thresholds of response.

U.S. Pat. No. 4,320,664 to Rehn et al. discloses a thermally compensated silicon pressure sensor.

U.S. Pat. No. 4,567,395 to Pundarika discloses a peizoelectric pressure transmitter for an internal combustion engine.

U.S. Pat. No. 4,570,097 to Shukla et al. discloses electrical connections for a piezoelectric pressure transmitter for an internal combustion engine.

U.S. Pat. No. 4,620,438 to Howng discloses a cylinder pressure transmitter for an internal combustion engine.

U.S. Pat. No. 4,616,114 to Strasser discloses a pressure responsive switch having little or no differential between actuation release pressure levels.

U.S. Pat. No. 4,633,579 to Strasser discloses a method for making a pressure responsive switch.

U.S. Pat. No. 4,645,965 to Paganelli discloses a cylinder pressure transmitter for an internal combustion engine.

SUMMARY OF THE INVENTION

An electronic fluid pressure sensor circuit for determining the fluid pressure in an engine includes a sensing means for sensing the fluid pressure and producing a differential signal representative of the fluid pressure. A circuit means receives the differential signal from the sensing means for determining the linear relationship between the fluid pressure and the differential signal.

Accordingly, the subject invention provides a low-cost, high-volume and solid state electronic pressure sensor device. The subject invention accurately represents oil pressure in a combustion engine and provides signals to an automotive microcomputer controller or bridge-type instrumentation circuit. The subject invention amplifies and conditions the electronic output from a piezoresistive pressure sensing device in a manner adequate for instrumenting oil pressure in an automobile. Further, the subject invention is designed for the rugged automotive under-hood environment.

DESCRIPTION OF THE DRAWINGS

Other objects, features and advantages of the present invention will become more fully apparent from the following detailed description of the preferred embodiment, the appended claims, and in the accompanying drawings in which:

FIG. 1 illustrates the transient protection circuit;
FIG. 2 shows the sensor and amplification circuit;
FIG. 3 shows the lamp driver circuit; and
FIG. 4 shows the gauge driver circuit.

DETAILED DESCRIPTION OF THE PREFERRED EMBODIMENT

The subject application is related to commonly assigned application, U.S. Ser. No. 07/114,331, by Miller, entitled "Electronic Oil Pressure Sensor Device" which was filed on the same day as the subject application and is directed solely to the mechanical structure in which applicant's circuit is mounted and used.

An electronic fluid pressure sensor circuit for determining the fluid pressure in an engine (not shown) is generally shown in FIGS. 1 through 4. The circuit comprises a sensing means for sensing the fluid pressure such as oil pressure in the engine and produces a differential signal representative of the fluid pressure. The circuit further comprises circuit means receiving the differential signal from the sensing means for determining the linear relationship between the fluid pressure and the differential signal.

The circuit means comprises four functional parts. They include the transient protection circuit in FIG. 1, the sensor and amplification circuit in FIG. 2, the lamp driver circuit in FIG. 3 and the gauge driver circuit in FIG. 4.

Referring to FIG. 1, a transient protection circuit is generally shown at 10. The transient protection circuit 10 includes a resistor R11 connected to a voltage supply source 12. A zener diode D2 interconnects resistor R11 and a common ground 14. The resistor R11 and diode D2 protect the circuits of FIGS. 2 through 4 from load dump and field decay transients. A capacitor C1 is connected in parallel with diode D2 and acts as a bypass capacitor to stablize the power supply line. A diode D3 is connected to resistor R11, diode D2, and capacitor C1. The diode D3 protects the amplification circuit shown in FIG. 2 from reverse voltage conditions.

Referring now to FIG. 2, the sensing means is included in the sensor and amplification circuit, generally shown at 20. The sensing means comprises a sensor S1 which is piezoresistive strain gauge implanted on a silicon die. Such a sensor is a Motorola SPX 6056D for a pressure range of 0–100 p.s.i. manufactured by Motorola Pressure Sensors of Phoenix, Ariz. Pin 1 of sensor S1 is connected to ground 14 and Pin 3 is connected to the transient protection circuit 10.

Given a bias voltage to pin 3 of the sensor S1, the sensor S1 produces two DC signal outputs across pins 2 and 4. The voltage difference across pins 2 and 4 is proportional to the differential pressure present at the sensor S1. This voltage difference is a differential signal received as an input to the amplification stage.

The sensor and amplification circuit 20 also acts as an amplifying means for amplifying the differential signal from the sensor S1. The sensor and amplification circuit 20 comprises a first amplification circuit 22 receiving the differential signal from the sensor S1 and a second amplification circuit 24 for receiving an output signal from the first amplification circuit 22. The first amplification circuit 22 comprises a first amplifier 26, resistors R4 and R5 and capacitor C3. Pin 2 of the sensor S1 is connected to the first amplifier 26. A capacitor C3 interconnects pin 2 of the sensor S1, first amplifier 26 and ground 14. Resistors R1, R2 and R3 interconnect ground 14 and pin 2 of sensor S1. Resistors R1, R2 and R3 as a resistive means for establishing a predetermined reference voltage. Resistor R4 interconnects resistors R1 and R2 and the first amplifier 26. Resistor R5 interconnects resistor R4 and the output of the first amplifier 26.

The second amplification circuit 24 comprises a second amplifier 28 and resistors R6 and R7. Pin 4 of the sensor S1 is connected to the second amplifier 28. Resistor R6 interconnects the output of the first amplifier 26, resistor R5 and the second amplifier 28. Resistor R7 interconnects resistor R6 and the output of amplifier 28. Resistors R4 and R7 have the same resistive value. Likewise, resistors R5 and R6 also have the same resistive value.

Referring to FIG. 3, a lamp driver circuit is generally shown at 30. The lamp driver circuit 30 acts an an indicating means for providing an indication of the fluid pressure. The lamp driver circuit 30 includes a comparator 32 having one lead connected to the second amplifier 28 and the other lead interconnecting to resistors R2 and R3. The comparator 32 acts as a means for comparing the voltage of the amplified signal from the second amplifier 28 with the predetermined reference voltage established by resistors R1, R2 and R3 and producing a control signal when the voltage difference exceeds a predetermined threshold value.

The lamp driver circuit 30 also includes a visual means for visually indicating when the fluid pressure is below a predetermined value. The visual means comprises a low pressure warning lamp 34 and lamp driver circuit 36 for allowing current to illuminate the lamp 34. The lamp driver circuit 36 comprises transistors Q3 and Q4, resistor R10 and capacitor C4. More specifically, a transistor Q3 is connected to the comparator 32. The collector of the transistor Q3 is connected to resistor R10 which is, in turn, connected to the transient protection circuit 10 and the emitter of transistor Q3 is connected to ground 14. A transistor Q4 is connected to transistor Q3 and resistor R10 and has the source connected to ground 14. A capacitor C4 interconnects the transistor Q4 and ground 14. The drain of transistor Q4 is connected to the lamp 34.

Referring to FIG. 4, a gauge driver circuit is generally shown at 40. The gauge driver circuit 40 also acts as an indicating means for providing an indication of the fluid pressure. The gauge driver circuit 40 comprises transistors Q1 and Q2, resistors R8 and R9, capacitor C2, zener diode D1, inductors L1 and L2 and amplifier 42. More specifically, the transistor Q2 has its source connected to the output of the second amplifier 28. The transmitter Q2 has its drain connected to an amplifier 42. A resistor R8 interconnects the transistor Q2, comparator 42 and the transient protection circuit 10. A resistor R9 interconnects transistor Q2, comparator 42 and ground 14. The output of amplifier 42 is connected to transistor Q1. A capacitor C2 interconnects comparator 42, transistor Q1 and ground 14 and prevents oscillations from occuring on the output of amplifier 42. A zener diode D1 is in parallel with transistor Q1 and is connected to ground 14. Diode D1 protects amplifier 42 from load dump transients. The transistor Q1 and diode D1 are connected to inductors L1 and L2 to act as a gauge menas for mechanically indicating the fluid pressure.

IN OPERATION

Given a bias voltage VCC from the transient protection circuit 10, the sensor S1 provides a voltage difference VS across pins 2 and 4 which is received by the first 26 and second 28 amplifiers, respectively. The first 26 and second 28 amplifiers determine the straight-line DC signal output representing pressure. The output VOUT of amplifier 28 is the difference of the offset voltage VOFF, determined by R1, R2, R3 and the amplified difference of sensor output VS received at amplifiers 26 and 28. Allowing resistors R4, R7 to have the same numerical value, and resistors R5, R6 to have the same numerical value, the output at amplifier 28 is given by:

$$VOUT = VOFF - VS(R4/R5 + 1)$$

where, $$VOFF = VCC(R1 + R2)/(R1 + R2 + R3)$$

and $$VS = V(PIN\ 2) - V(PIN\ 4).$$

When the engine oil or fluid pressure is below the pre-set value VCO, comparator 32 switches through the lamp 34, warning the vehicle operator of the condition. When the fluid pressure is above the pre-set value determined by VCO, transistor Q3 will be on and transistor Q4 will be off, breaking the current path through the lamp 34.

When the fluid pressure is below the pre-set value VCO, transistor Q2 will be off, allowing amplifier 42 to follow the voltage set by resistors R8 and R9. When the fluid pressure is above the pre-set value VCO, transistor Q2 will be on, allowing the output signal of second amplifier 28 to reach the gauge driver amplifier 42 allowing for indication of pressure.

Typically, automotive applications require that the lamp illuminate at a low (e.g., 3.0–6.0 psig) pressure making the difference between VOFF and VCO extremely small (less than 100mV) and hard to realize with two voltage divider networks of 1% resistors. The single divider network comprised of resistors R1, R2 and R3 reduces the effects of resistance tolerancing on the performance of the circuit. This is achieved by selecting R1 and R3 two orders of magnitude greater than R2 thereby reducing the effects of the tolerancing of R2.

In electronic instrument cluster applications where instrumentation is performed by a microcomputer and vacuum fluorescent displays, the lamp driver circuit 30, transistor Q2 and resistors R8, R9 may be eliminated. The open-drain output of Q1 is "pulled-up" and converted to digital signal by an A-D converter. The microcomputer reads the digital signal, determines and displays the pressure on a display.

In summary, media pressure is sensed by and translated to a proportional differential voltage by sensing element S1. Differential voltage is amplified to control a low-pressure indicator lamp, pressure gauge and/or electronic instruments.

The invention has been described in an illustrative manner, and it is to be understood that the terminology which has been used is intended to be in the nature of words or description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An electronic fluid pressure sensor circuit for determining the fluid pressure in an engine, the circuit powered by a supply source, the circuit comprising:

sensing means for sensing fluid pressure and producing a differential signal representative of the fluid pressure where the sensing means is a piezoresistive device implanted on a silicon die;

amplification means for amplifying said differential signal where the amplification means includes a first amplification circuit receiving said signal from said sensing means and a second amplification circuit receiving said output signal from said first amplification circuit and where said amplification means further includes a single voltage divider for establishing a predetermined reference voltage, where the single voltage divider comprises three resistors connected in series where the resistive value of the first and third resistor are at least two orders of magnitude greater than the second resistor, thereby reducing the effects of tolerancing due to the second resistor;

comparator means for comparing the voltage of said amplified signal to a reference voltage and producing a control signal;

a lamp and a lamp driver circuit for allowing current to illuminate said lamp in response to said control signal;

gauge means for following the control signal and indicating the value of the fluid pressure; and transient protection means for preventing the voltage from a supply source from exceeding a predetermined value.

2. An electronic fluid pressure sensor circuit for determining the fluid pressure in an engine, the circuit powered by a supply source, the circuit to work with a microcomputer, an A-D converter and a microcomputer controlled display in an electronic instrument cluster the circuit comprising:

sensing means for sensing fluid pressure and producing a differential signal representative of the fluid pressure where the sensing means is a piezoresistive device implanted on a silicon die;

amplification means for amplifying said differential signal where the amplification means includes a first amplification circuit receiving said signal from said sensing means and a second amplification circuit receiving said output signal from said first amplification circuit and where said amplification means further includes a single voltage divider for establishing a predetermined reference voltage, where the single voltage divider comprises three resistors connected in series where the resistive value of the first and third resistor are at least two orders of magnitude greater than the second resistor, thereby reducing the effects of tolerancing due to the second resistor;

comparator means for comparing the voltage of said amplified signal to a reference voltage and producing a control signal;

gauge means for following the control signal, the output of the gauge means being converted to a digital signal and then presented to the microcomputer which determines the value of the fluid pressure and drive the microcomputer display in response thereto; and transient protection means for preventing the voltage from a supply source from exceeding a predetermined value.

* * * * *